United States Patent
Steffen et al.

[15] 3,656,988
[45] Apr. 18, 1972

[54] METHOD FOR THE FABRICATION OF HOLES IN A WORKPIECE BY MEANS OF LASER-BEAMS AND APPARATUS FOR THE PERFORMANCE OF THE AFORESAID METHOD

[72] Inventors: Jurg Steffen, Zurich; Arnold Hofer, Muttenz, both of Switzerland

[73] Assignees: Watch Stones Co., Ltd., Berne; Turlabor AG, Zumikon, Switzerland

[22] Filed: Feb. 19, 1970

[21] Appl. No.: 12,691

[30] Foreign Application Priority Data

Feb. 27, 1969 Switzerland ..................2951/69
Feb. 27, 1969 Switzerland ..................2956/69

[52] U.S. Cl. .................117/5.5, 117/8, 117/93.3, 117/93.31, 148/9, 148/9.5, 156/243, 219/68
[51] Int. Cl. .........................B44d 1/52, B44d 1/02
[58] Field of Search .............117/5.5, 93.3, 8, 93.31; 219/68; 148/9, 9.5; 156/243

[56] References Cited

UNITED STATES PATENTS 3,562,009 2/1971 Cranston et al. .................117/93.3
3,410,979 11/1968 Larsson .................219/68

FOREIGN PATENTS OR APPLICATIONS 1,468,426 12/1966 France .................117/93.3

*Primary Examiner*—Alfred L. Leavitt
*Assistant Examiner*—M. F. Esposito
*Attorney*—Werner W. Kleeman

[57] ABSTRACT

A method for producing holes in a workpiece by means of a laser beam which comprises the steps of coating at least one face of the workpiece with an organic agent prior to contact of the laser beam with the workpiece in order to thereby prevent a fusion of the workpiece material ejected in liquid state with an outer face of such workpiece during the boring process.

There is also disclosed an apparatus used in the performance of this method and for coating both sides of disc-shaped workpieces which incorporates two band members guided above one another at a spacing along a predetermined path. This spacing of the band members is smaller than the height of the workpieces. One of the band members has a smooth surface and the other an adhesive surface, and two coating locations are arranged such that one is before and the other behind the aforementioned predetermined path.

8 Claims, 1 Drawing Figure

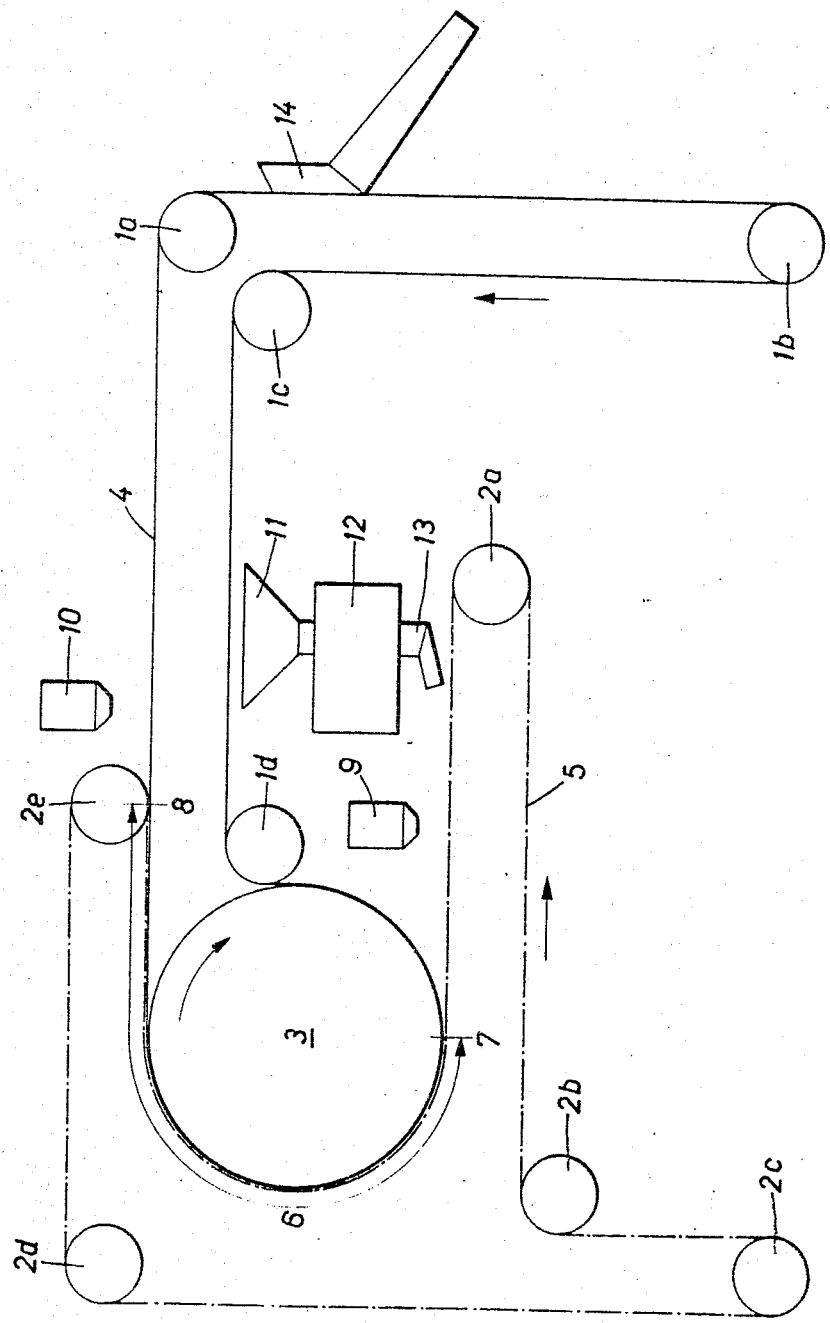

3,656,988

METHOD FOR THE FABRICATION OF HOLES IN A WORKPIECE BY MEANS OF LASER-BEAMS AND APPARATUS FOR THE PERFORMANCE OF THE AFORESAID METHOD

BACKGROUND OF THE INVENTION

The present invention relates to an improved method for the fabrication of holes in a workpiece by means of laser-beams and further pertains to an improved apparatus for the performance of the aforesaid method.

Methods for the fabrication of holes by means of laser-beams are known to the art. In these known techniques there could not, however, be prevented that the front side of the workpiece and—with through passing holes also at the rear side or face—about the bore or hole openings, that there was formed such a crater-shaped protrusion of material ejected by the laser-beam which is fused with the workpiece, which, above all, is then undesirable if a great deal of value is placed upon a planar or flat configuration of the bored or apertured surface.

It has already been proposed to coat the surface of the workpiece which is to be contracted by the laser-beams. Yet these coatings are neither destined to nor suitable for preventing the drawback of crater formation by virtue of the ejected material. Hence, it was desired with these known coatings to either improve the absorption or to generate a vapor pressure in order to keep the formed hole free, in other words, in order to prevent the subsequent closing of such hole or bore.

SUMMARY OF THE INVENTION

Accordingly, it is a primary object of the present invention to provide an improved method of and apparatus for the fabrication of holes or bores in a workpiece by means of laser-beams which effectively overcome the aforementioned drawbacks of the prior art techniques and apparatus structures.

Another, more specific object of the present invention relates to an improved method as well as an improved apparatus for the performance of such method, by means of which the mounds or rejected material brought about by the laser-beam can be readily removed from the relevant workpiece surface.

Still a further object of the present invention relates to an improved method and apparatus for the formation of holes or bores in a workpiece by means of a laser-beam in an economical and efficient manner wherein the material ejected during the boring process, by virtue of the action of the laser-beam, can be readily removed from the surface of the workpiece without a great deal of additional treatment or work.

Now, in order to implement these and still further objects of the present invention, which will become more readily apparent as the description proceeds, the method of the invention, which pertains to producing holes or bores in a workpiece by means of a laser-beam, broadly speaking, comprises the steps of coating at least one face of the workpiece with an organic agent prior to contact of the laser-beam with the workpiece, in order to thereby prevent fusion of the workpiece material ejected in liquid state with an outer face of such workpiece during the boring operation.

The inventive apparatus for the performance of the aforesaid inventive method and serving for coating both sides of substantially disc-shaped workpieces is generally manifested by the features that there are provided two band members or the like which are guided in superimposed fashion above one another at a spacing along a predetermined path, this spacing being smaller than the height of the workpiece. One of these band members possesses a smooth surface and the other an adhesive surface, and two contact locations are arranged in such a fashion that one such contact location is arranged before and the other such contact location behind the aforementioned predetermined path.

BRIEF DESCRIPTION OF THE DRAWING

The invention will be better understood and objects other than those set forth above, will become apparent, when consideration is given to the following detailed description thereof. Such description makes reference to the annexed drawing wherein the single FIGURE shows the preferred embodiment of the inventive apparatus used in the performance of the inventive method.

DETAILED DESCRIPTION OF THE METHOD AND PREFERRED EMBODIMENT OF APPARATUS

Describing now more specifically the invention under consideration, it has been found that by coating the surface impinged by the laser-beam of a workpiece which is to be throughbored, or with throughgoing or throughpassing holes, additionally the rear side of the workpiece, with an organic boring agent, which upon contact with the ejected material which is thrown out in liquid state during the boring operation, changes and in turn, forms a non-adhering intermediate layer upon the workpiece surface between the material particles which are removed by the laser-beam. Consequently, the ejected material after termination of the boring or aperturing process can be readily removed from the relevant workpiece surface without difficulty.

Furthermore, it has been found that by virtue of this surface film the laser light can penetrate without difficulty into the material and enable the machining (boring) of the workpiece in accordance with the intensity distribution of the laser radiation.

Above all, as the organic coating agent there come under consideration polymers, such as:
a. copolymers of methylmethacrylate, butylacrylate and quaternary N,N-dimethylaminoethylmethacrylate,
b. copolymers of methylmethacrylate, decylmethacrylate and quaternary N,N-dimethylaminoethylmethacrylate,
c. polyblends of polyvinylalcohol-polyvinylacetate and poly-N,N-dimethylaminoethylmethacrylate.

Low molecular weight substances, such as sugar, for instance raw sugar.

A quarternary ammonium compound, for instance trimethyldecyl-ammonium chloride.

Mixtures of polymers and low molecular weight substances, such as for instance poly(vinylacetate-vinylalcohol) and trimethyl-decylammonium chloride.

An exemplary composition of a coating agent suitable for the purposes of the invention could be as follows:
methanol 990 ml.
copolymers 10 ml. (consisting of 50 percent solids)
copolymers of
2 mols. methylmethacrylate
1 mol. butylacrylate
1 mol. N,N-Dimethylaminoethylmethacrylate, wherein the entire mixture after polymerization is quaternized with butyrolactone.

These substances are particularly suitable in dissolved condition for coating of workpieces. However, the possibility also exists, at least for certain of these substances, to apply them in a paste-like condition or also liquid or—with a coating by evaporation—to apply same in gaseous condition to the workpiece.

The mentioned coating agents possess, above all, the effect that they adhere well to the workpiece prior to impingement by the laser beam, and this good adherance, however, after impingement by the laser beam, that is to say, after changes by virtue of the thermal influences, disappears, so that the coating agent residues together with the ejected material can be easily removed chemically or mechanically.

Suprisingly, it has now been found that the mentioned coating agents, apart from the aforementioned effect of preventing the adherence of the ejected material to the workpiece surface, enable attaining a considerable improvement of the quality of the hole or bore in the sense that, on the one hand, instead of producing the conventional bores of substantially cone-shaped configuration there can be produced bores of cylindrical shape, and, on the other hand, there no longer occur the crater-shaped locations which cannot be prevented with the techniques known up to the present. Additionally, there is the factor that also the danger which exists when not using a coating agent that a bore or hole will again fuse together at its end, is practically eliminated by virtue of the inventive teachings. This additional effect is especially then of decisive importance when the bore hole should be used as a bearing for a rotating journal or pin.

It has been assumed that these effects have been achieved in that:

By virtue of the small surface tension of the coating agent the ejected liquid material droplets disperse upon the surface of the workpiece and, therefore, rapidly cool. As a result, the ejected material becomes brittle and can be easily removed.

By virtue of the accommodated index of refraction ($1 < n$ (coating agent) $\leq n$ (workpiece)), especially with rough surfaces which strongly disperse the laser light, the surface quality of the workpiece is optically improved.

The workpieces can consist of any optional material and can have any random shape. A particularly interesting application of the inventive method is the forming of holes or bores in watch jewels or rubies. In this application, it is advantageous to add to the coating agent a quarternary ammonium-compound, for instance trimethyldecylammonium chloride, in order to prevent the electric charging of the watch jewels. As a result the jewels can be manipulated much better for processing or working thereof.

Turning attention now to the apparatus structure depicted in the single figure of the drawing, it will be understood that such relates to an apparatus wherein the workpieces are watch jewels. This apparatus will be seen to embody two band members 4 and 5 which are guided over deflecting rollers 1a, 1b, 1c, 1d and 2a, 2b, 2c, 2d, 2e, respectively, and a deflecting drum member 3. Of these two band members 4 and 5, one of them, namely the band member 4 is formed of an adhesive material, for instance rubber, and the other band member 5 of a smooth material, for instance a soft-PVC. The deflecting rollers 1a, 1b, 1c, 1d and 2a, 2b, 2c, 2d and 2e, respectively, are arranged in such a manner that the band members 4 and 5, respectively, are guided above one another along the path 6 which extends from point 7 to point 8. Within this path there is located the deflecting drum member 3, wherein both band members 4 and 5 conjointly wrap around such deflecting drum member 3 through an angle of approximately 180°, as shown.

A first coating location or station in the form of a nozzle member 9 is arranged above the band member 5 in front of the path 6, whereas a second coating location or station in the form of a nozzle member 10 is arranged behind this path 6. A filling funnel 11 as well as the feed vibrator 12, and finally, the infeed magazine 13, are arranged in the direction of travel of the band 5 in front of the nozzle member 9, along an essentially horizontal path of the band member 5 between the deflecting roller 2a and the deflecting drum member 3. A stripping device 14 is provided at the essentially vertical path of the band member 4 between the deflecting rollers 1a and 1b, as shown.

The workpieces which are to be contacted at both sides with a suitable coating agent are filled into the funnel 11 and through the action of the vibrator 12 are introduced into the infeed magazine 13, with the front side or face of the workpieces facing towards the top. The workpieces are then delivered from the infeed magazine 13 onto the horizontal path of the band 5 between the deflecting roller 2a and the nozzle 9 upon such band. With the front side or face of the workpieces looking upwardly or towards the top, these workpieces are then passed beneath the nozzle member 9 and at the same time coated or contacted by the relevant coating agent. Thereafter, the thus treated workpieces arrive at the location 7 where the band member 5 is placed over the band member 4 and together with such is wrapped around the drum member 3, as shown in the drawing. The workpieces are then retained between both of the band members 4 and 5 up to the location 8, where the smooth band 5 by virtue of the deflecting roller 2e is again removed from the adhesive band 4, to thus release the rear face or side of the workpiece which is now situated towards the top, in other words looking in the direction of the nozzle member 10. In this position, the workpieces arrive at the operating zone of the spray nozzle member 10, where now the rear side or face is appropriately coated. By means of the action of the deflecting roller 1a the workpieces now reach the stripping device 14, from where they are delivered to a suitable laser-beam device, which for the purpose of preserving clarity in illustration has not been shown in the drawing. The deflecting rollers 1b and 2c form components of a respective non-illustrated cleaning device for each of both band members 4 and 5, where the residues or remains of the coating material or agent can be removed by any suitable removal means such as brushes from the band members 4, 5.

Continuing, an apparatus construction would be conceivable in which there is dispensed with the common deflection of both band members 4 and 5 and both of these band members would then only be guided above one another at a certain spacing along a predetermined path, this spacing being smaller than the height of the watch jewels. The watch jewels would then be delivered to this path on the lower non-adhesive band member and after moving through the relevant path would adhere to the upper adhesive band member, so that the lower not yet coated face or side of the watch jewels is freely exposed and, in turn, can be coated.

Experiments have shown that in this manner it is possible in a simple and a rational way to prevent the fixed adherence of the ejected material about the bores or holes produced by the action of the laser-beams, and furthermore, to considerably improve the cylindricality of such bores or holes.

While there is shown and described present preferred embodiments of the invention, it is to be distinctly understood that the invention is not limited to, but may be otherwise variously embodied and practiced within the scope of the following claims.

What is claimed is:

1. Method for producing holes in a workpiece by means of laser-beams comprising the steps of coating at least one face of the workpiece with an hydrophilic organic agent selected from a compound possessing hydroxy groups or quaternized ammonium groups, or mixtures of such compounds, prior to contact of the laser-beam with the workpiece in order to prevent fusion of the workpiece material ejected in liquid state with an outer face of such workpiece during the boring operation.

2. Method as defined in claim 1, wherein said coating agent contains a copolymer of methylmethacrylate, butylacrylate and quaternized N,N-dimethylaminoethylmethacrylate.

3. Method as defined in claim 1, wherein said coating agent contains a copolymer of methylmethacrylate, decylmethacrylate and quaternized N,N-dimethylaminoethylmethacrylate.

4. Method as defined in claim 1, wherein said coating agent contains a poly blend of polyvinylalcohol-polyvinylacetate and poly-N,N-dimethylaminoethylmethacrylate.

5. Method as defined in claim 1, wherein said coating agent contains a sugar.

6. Method as defined in claim 1, wherein said coating agent contains a quaternized ammonium compound.

7. Method as defined in claim 6, wherein said quaternized ammonium compound is trimethyldecylammonium chloride.

8. Method as defined in claim 1, wherein said coating agent contains poly(vinylacetate-vinylalcohol).

* * * * *